United States Patent Office 3,443,656
Patented May 13, 1969

3,443,656
HYDROSTATIC TRANSMISSION WITH MECHANICALLY LINKED PUMP AND MOTORS
Karl Stolz, Strassbessenbach, Germany, assignor to Linde Aktiengesellschaft, Wiesbaden, Germany, a corporation of Germany
Filed Mar. 5, 1968, Ser. No. 710,508
Claims priority, application Germany, Mar. 6, 1967, L 55,919
Int. Cl. B60k 3/02, 17/10; F16d 33/02
U.S. Cl. 180—66                                    10 Claims

ABSTRACT OF THE DISCLOSURE

A hydrostatic power transmission in which a variable-displacement hydraulic pump (3, 103, 203) has its input shaft (1, 101, 201) driven and is hydraulically connected with at least one but preferably two hydrostatic motors (7, 7'; 107, 107'; 207) with tiltable control portions whose angle of tilt determines the displacement of pump and motors; a link (9, 109, 209) is articulated to the pump and to a double-arm lever (11, 111, 211) which is hinged at 12, 112 and 12', 112' to the tiltable portions of the motors (7, 7') on opposite sides of the respective axis (13, 13'), the motors being rotated with respect to one another through 180°.

---

The present invention relates to a hydraulic power transmission which comprises a variable-displacement hydraulic pump coupled with one or two variable-displacement hydraulic motors, the pump being adapted to receive power from a power source (e.g., a motor vehicle engine) and the motors being adapted to deliver power to loads (e.g., the driven wheels of the vehicle), the transmission ratio between pump and motor speed being determined by relative displacements of the pump and the motors.

The invention is concerned with a hydraulic power transmission having a hydrostatic pump and two hydrostatic motors, each unit being of the tilting-head kind and each comprising a rotary member or drive flange secured to a driving or driven shaft and a head tiltable about a tilt axis relative to the rotary member; the tilting head of the pump is pivotally connected to the tilting heads of the motors so that the tilting movement of the former affects the tilting movements of the latter, the tilt angles of the motor heads being greatest at or near zero displacement of the pump head, and the angles of the motor heads being smallest at the greatest displacement of the pump head permitted by the system. Pumps and motors of this general type are shown in my U.S. Patent 3,279,173 and in commonly assigned Patents Nos. 3,299,-635, 2,975,597 and 2,981,068; other pump and motor transmissions of analogous kind are found in U.S. Patents Nos. 3,142,963 and 3,163,987.

Prior art has been primarily concerned with an arrangement wherein two couplings are symmetrically attached to the tiltable head of a pump unit and equidistant from the longitudinal axis of the pump drive shaft, the other ends of these couplings being attached each to the tilting head of a motor in such a way that the motor drive shafts are coaxial and perpendicular to the longitudinal plane of the pump drive shaft. The symmetry of the latter arrangement persists only while the pump is at zero displacement but is lost at any other pump position which disturbs the original orientation of the three units relative to one another and imparts a different torque to each of the motors when they are connected in parallel. Should the head of the pump be connected separately to each of the motors, the motors will rotate at different speeds and, if synchronization is imposed through external means, pressure in one of the motors will build up to the point where hydraulic fluid has to be drained off through a pressure-relief valve.

It is an object of the present invention to overcome disadvantages of this nature and to provide a hydraulic transmission of symmetrical stability and structural strength.

Another object is to provide a simple hydraulic transmission adapted to be used with one or more hydraulic motors.

Yet another object of this invention is to provide a mechanical coupling between a hydrostatic pump and one or more hydrostatic motors whereby, with proportionately small displacements of the pump from its null position, the restoring or return swing of the motor or motors is very small and, indeed, smaller than the stroke possible with earlier linkage systems.

These objects and others which will become apparent hereinafter are attained, in accordance with the present invention, by a hydraulic transmission assembly which permits continuous automatic adjustment of the speed ratio between the input shafts of a hydraulic pump and the output shafts of at most two hydraulic motors. It is thus an important feature of the invention that the tiltable head of a hydraulic pump is pivotally connected to a coupling rod which, at its other end, is pivotally attached to a two-armed lever. The coupling rod pivot may be offset from the plane of the axes of the pivots between the double-arm lever and the respective motors.

The advantageous transfer of the tilting motion of the pump head to the tiltable motor heads by means of the described linkage can be realized even if a hydraulic transmission system consists of a pump and one motor only; in that case the free end of the lever arm is to be connected to an auxiliary lever pivotally attached to a fixed housing so that the axis of rotation of the swivel lever is in the same place where the axis of rotation of the second motor would have been. The arrangement for the balance of forces is particularly effective when displacements of the pump from its zero position are associated with small oscillations of the hydraulic motor and of the couplings which simulate the second hydraulic motor.

According to a more specific feature of this invention, the sole means connecting the tiltable motor bodies, which are connected in parallel hydraulically to the hydrostatic pump, is a double-arm lever whose pivots at the respective motors are disposed on opposite sides of the axes of rotation of the cylinder barrels of these motors, while a single link is pivotally connected to the double-arm lever and to the tiltable pump body. The motors are not symmetrically positioned but are rotated relatively through 180°. According to a further feature of this invention, the pivot connecting the link to the double-arm lever is guided in a slot or other guideway.

In extension of previously developed hydraulic assemblies, provision can be made to transport hydraulic fluid through the rigid coupling rod as well as through the lever to the motor or motors.

The above and other objects, features and advantages of my invention will become more readily apparent from the following description, reference being made to the accompanying drawing in which.

Figure 1:
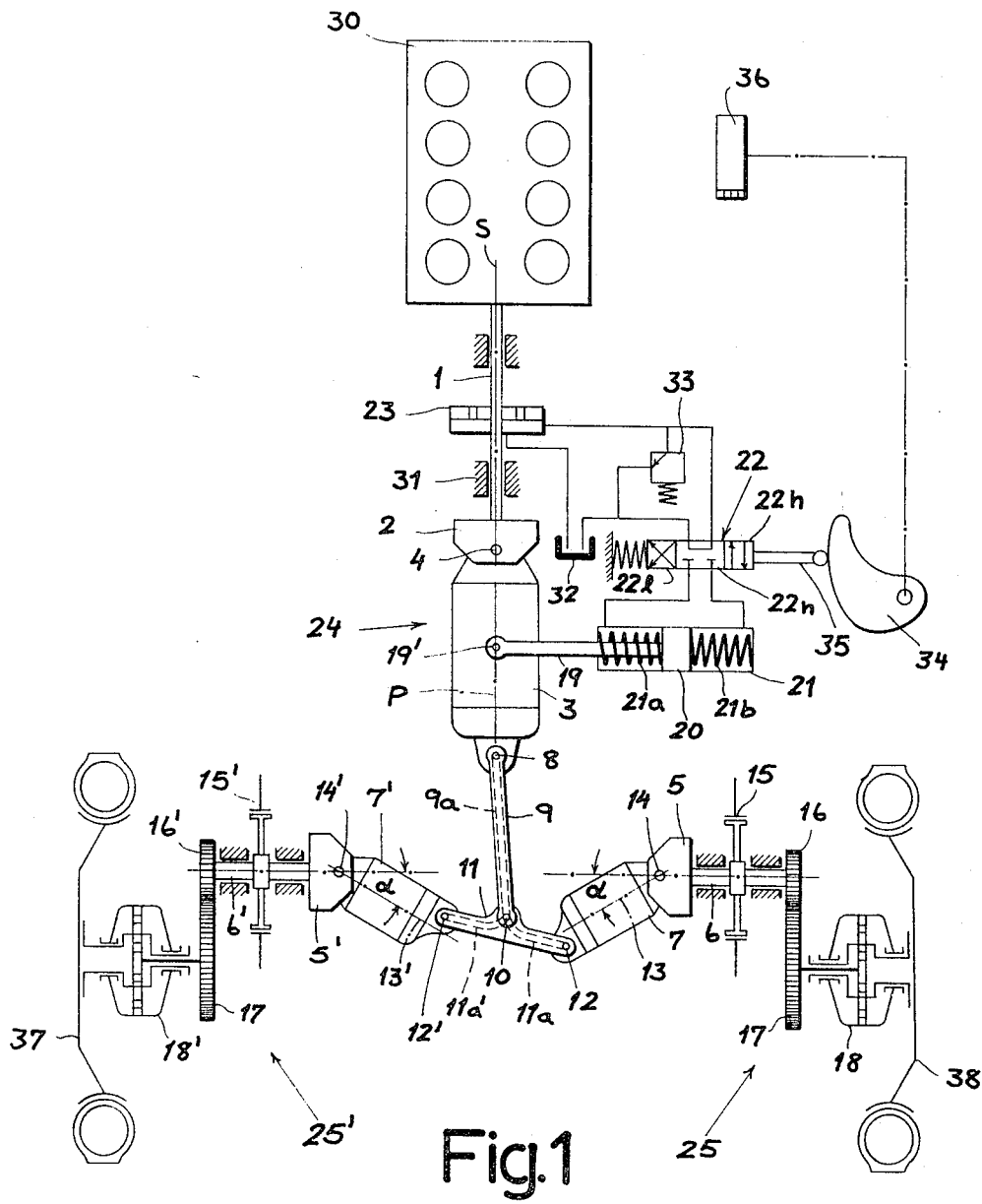
FIG. 1 is a diagrammatic view of a hydraulic system embodying the present invention, part being shown in cross-section.

The system of FIG. 1, in its broadest sense, comprises an internal-combustion engine 30 which is connected to the input shaft 1 of the nonpivotal body 2 of a hydrostatic pump assembly 24 whose tiltable head 3 has an axis P which is aligned with the axis S of shaft 1 in the null displacement or null position of the pump body. The latter is tiltable about a first fixed point 4 on the vehicle chassis or structure 31. The input shaft 1 also drives a gear-type pump 23 (see Fluid Power, U.S. Government Printing Office, 1966, pages 99 ff.) which displaces fluid from a reservoir 32 to a control valve 22 whose positions are represented at 22n, 22h and 22l, respectively. A pressure-relief valve 33 shunts fluid from the pump 23 to the reservoir 32 when the output of pump 23 exceeds the fluid requirements of a control cylinder 21 whose piston 20 is connected by a rod 19 at a pivot 19' to the pump head 3. A pair of centering springs 21a and 21b within the cylinder 21 serve to center the piston 20 while a cam 34 controls the valve member 35 and may be operated by a lever of pedal 36 in the driver's compartment of the vehicle. The cam 34 is designed to shift the valve member 35 between the neutral position 22n of the valve, in which fluid is shunted from the pump 23 to the reservoir 32, and the flow to and from the cylinder 21 is blocked, to either limiting position 22h or 23l. In the former, hydraulic fluid is delivered by the pump 23 to the chamber 21b on the right-hand side of piston 20 while fluid from the left-hand chamber is led to the reservoir 32. The piston 20 is driven to the left to displace the pump head 3 from its null position (FIG. 1) in the blockwise sense about the first pivot 4 to an extreme position through selected intermediate positions, dependent upon the degree of rotation of the cam 34. In the position 22l of the valve member, hydraulic fluid is permitted to pass from the right-hand chamber of the cylinder 21 to the reservoir 32 while fluid from the pump 23 is delivered to the left-hand chamber, thereby shifting the piston 20 to the right.

The basic system comprises, in addition, a pair of driven wheels 37 and 38 which are connected by planetary gear assemblies 18 and 18' with the output shafts 6 and 6' of the hydrostatic motors of a pair of motor assemblies 25 and 25', in the right and left sides of the vehicle, respectively. The motors may be of the type illustrated and described in any of the aforementioned applications (see also Fluid Power, pages 199 ff.). As pointed out in the latter publication, the axis of the output shafts 6 and 6' may include an angle α with the axis 13 and 13'.

It will be observed that the motors 5, 7 and 5', 7' are pivotally connected to the double-arm lever 11 at 12 and 12' (i.e., at locations on opposite sides of their axes 13 and 13') and that the locations 12 and 12' are offset from the plane perpendicular to the paper through the axes 13 and 13' including the pivots 14 and 14'. Moreover, with respect to one another, the mutually identical motors 5, 7 and 5', 7' are turned about the axis 5 and 6' through 180°.

From FIG. 1 it can be seen that the drive shaft 1 of pump assembly 24 is carried in the fixed pump housing 2 to which is attached the pump head 3 rotatable about the first pivot 4. Each of the two hydraulic motors 25, 25' consists of the fixed body 5, 5' which drives the output shaft 6, 6' at one end, and a tiltable head 7, 7' at the other end which is pivoted at the second and third pivot points 14, 14'. The tiltable head of barrel 3 of pump 24 is connected to one end of link 9 through the pivot 8. At its other end the rod 9 is joined to the two-armed lever 11 by pivot 10 which carries at each end pivots 12, 12' to connect it with the tiltable motor body 7, 8'. Pivots 12, 12' can never *both* lie in the plane, normal to the plane of the paper, that passes through pivots 14, 14' and the axes 13, 13' of the tiltable motor head 7, 7' (see FIGS. 4A–4C). According to the invention embodied in the drawing, pivot 12, on the right-hand side, lies on the far side (relative to the pump) with respect to the axial plane through axis 13', normal to the plane of the paper, and coupling 12' on the left-hand side of the rod 9 lies on the near side (relative to the pump) of the motor head 7' in respect to the corresponding plane through axis 13'. At zero displacement of the pump, the axes of the pivots 4, 8 and 10 lie in the same plane, and the tilt of the motor heads 7, 7' is greatest with respect to the motor shafts 6, 6'.

At the greatest displacement of the pump head permitted by the system, the angular tilt of the motor bodies is least with respect to the shafts. The lever arms and the shafts of the motor are not in coaxial alignment (FIGS. 1 and 4A–4C), when the motors are relatively rotated by 180° as in the accompanying drawing.

Link 9 is provided with a conduit represented at 9a which delivers hydraulic fluid from the pump 3 to a pair of conduits 11a and 11a' formed in the lever 11. The latter conduits communicate with the motors 5, 7 and 5', 7'.

The drive shaft 6, 6' of each of the two motors carries the brake 15, 15' and is attached to a pinion gear 16, 16' which meshes with the driven gear 17, 17' to connect the shaft with the planetary drive 18, 18'. The tiltable head 3 of the pump is connected by the pivot link 19 to the piston 20 of the operating cylinder 21 which obtains its operating fluid from the control valve 22 and pump 23 driven by the pump shaft 1.

Figure 2:
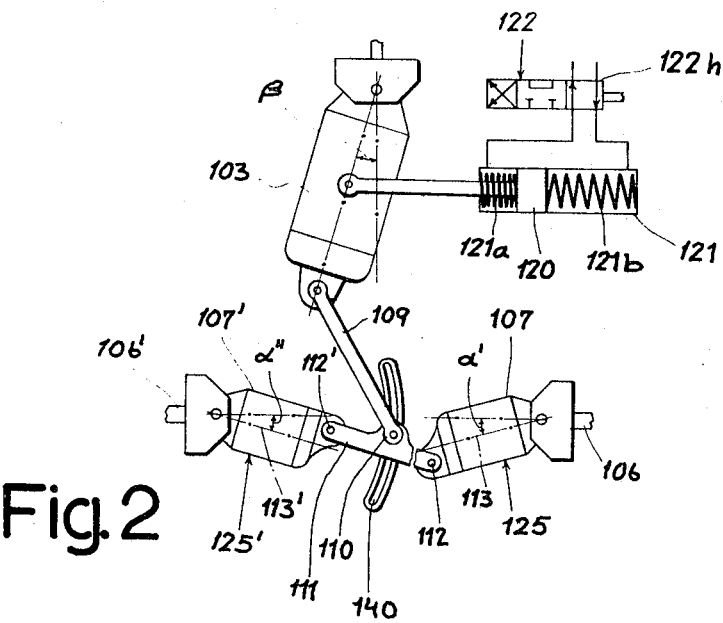
FIG. 2 is a diagram of the relative positions of the several parts upon deviation of the tiltable pump body from its null position.

In FIG. 2, I show an embodiment of this invention wherein the pump body 103 is displaced from its null position by an angle β in which the pump is effective to displace fluid to the motors 125 and 125' whose motor heads 107, 107' have been swung to a lesser angle α of tilt with respect to the axis of their shafts 106, 106'. In this embodiment, the pivot pin 110 at which the link 109 is joined to the double-arm lever 111 is received in a guideway 140 which serves to destress the pivots 110, 112 and 112' and prevent play in the kinemetric system. In this embodiment also the piston 120 of the cylinder 121 is shown in a left-hand position in which the spring 121a is compressed and spring 121b is extended. This position corresponds to the position 122h of the valve 122 which may be connected in a hydraulic circuit between a circulating pump and reservoir as described above. Here, too, the pivot locations 112 and 112' are offset from the axes 113 and 113' to opposite sides thereof. Hydraulic fluid may be supplied to the motors via conduits in the link 109 and lever 111 as previously described.

Figure 3:
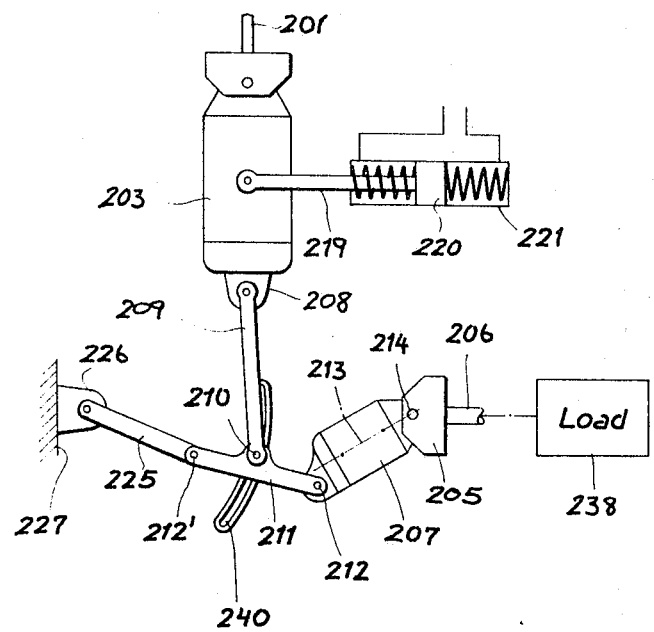
FIG. 3 is a diagram of a system according to this invention using a single motor.

In the embodiment of FIG. 3 one of the two motor bodies has been replaced by the articulation 225, connected by the pivot 226 to the fixed structure 227.

The double-arm lever 211 of this embodiment is connected by pivot 210 (slidable in a guideway 240) to the link 209 at one end thereof. At its other end, the link 209 is pivotally connected at 208 to the swingable pump barrel 203 which can be displaced by a rod 219 of piston 220, the latter being slidable in a cylinder 221 as previously described. In this embodiment, only a single motor is shown at 205, 207. The swingable head 207 of this motor has an axis 213 and is pivoted at 214 at a fixed location on the housing structure 227. The nonswingable body 205 of this motor drives a shaft 206 whose load is represented at 238. In this embodiment also, a pivot 212 connects one arm of the lever 211 to the head 207 of the motor. At its other end, the lever 211 is connected by a pivot 212' to the articulation member 225. Shaft 201 may be driven by an internal combustion engine while the load 238 may represent both driven wheels of the vehicle, the wheels being displaced via a differential at which the shaft 206 terminates.

Figure 4A:
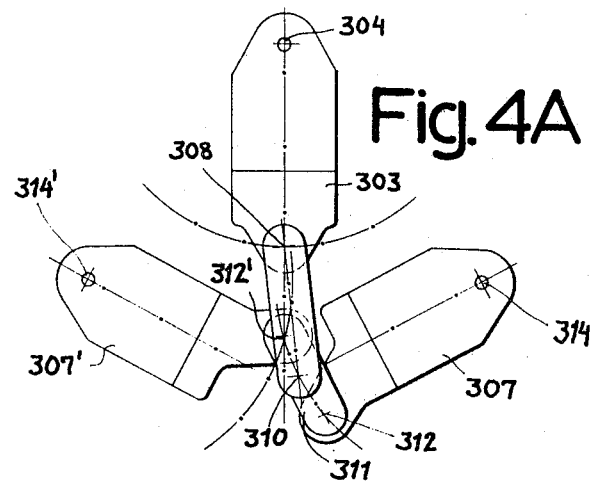
FIGS. 4A–4C are views representing the relative position of the pump and the motors of a system analogous to FIG. 1.
Figure 4B:
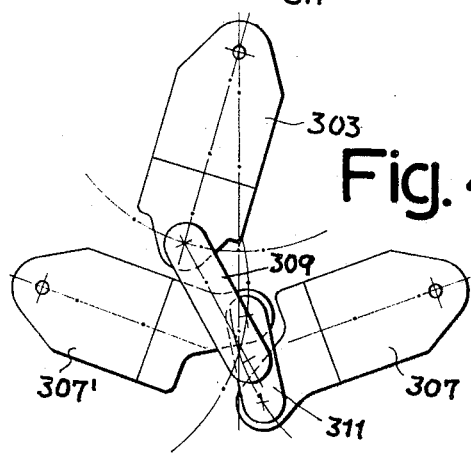
Figure 4C:
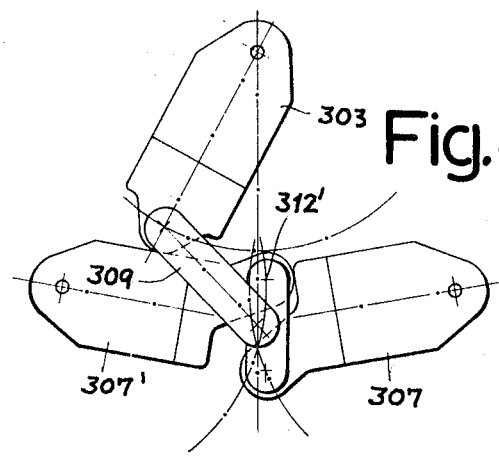

In FIGS. 4A–4C, I show a more precise version of the present invention wherein the relationships of the length of the links and levers correspond in substance to the relationship of these parts used in practice. In the systems of FIGS. 1–3, the length and orientation of the length have been destroyed in order to facilitate an understanding of the overall character of this invention. Thus, in FIG. 4A, the swingable head of pump 303 is shown in its null position with the link 309 pivotally connected at 310 to the double-arm lever 311 and oriented such that the pivot 312' of motor 307' lies just slightly to the left of the line connecting pivots 308 and 310 while the pivot 312 of motor 307, located to the right-hand side of this axis, has an axis parallel to that of pivot 312'. When the motor 303 is swung in the clockwise sense by the hydraulic means illustrated in FIG. 1, for example, the pivot 312' swings to the right while the pivot 312 lies to the left of the centerline connecting the pivots 308 and 310 (FIG. 4B). Simultaneously, lever 311 is drawn upwardly towards pivot 304 and both motors 307 and 307' are swung by corresponding angular amounts about their pivots 314 and 314'. The extreme position, in which the motors 307 and 307' have maximum angular deviation through the plane of the pivotal axis 314 and 314', is illustrated in FIG. 4C. It will be evident from the relative positions illustrated in FIGS. 4A–4B that an important advantage of the system of the present invention resides in the fact that with small swinging movement of the pump from its null position, the return swing (clockwise for motor 307 and counterclockwise for motor 308') is relatively small and certainly much reduced by comparison with the stroke of prior-art motors with a corresponding swing of the pump out of its null position. An important result of this feature is that the system gives optimum characteristics since, at relatively slow speeds, corresponding to small deviations of the pump from null position, it is desirable that a correspondingly small motor deviation be provided to allow the transmission to control the drive via the pump. Large deviations are effected with a large displacement of the motor albeit with a somewhat reduced change in the effectiveness of the pump.

I claim:
1. A hydrostatic transmission mounted on a support structure and comprising:
   a variable-displacement hydrostatic pump having a swingable pump body pivoted at a first point fixed with respect to said structure the angle of tilt of the axis of the pump body controlling the hydraulic displacement of said pump;
   a hydrostatic motor hydraulically connected with said pump and drivable thereby while having a tiltable motor body with an axis swingable about a second point fixed with respect to said structure and of a variable capacity controllable by the tilt of said motor body about said second point; and
   mechanical coupling means between said pump and said motor, said coupling means comprising an elongated link pivotally connected at one end to said pump body at a location offset from said first point, a double-arm lever pivotally connected to the other end of said link at a location intermediate the arms of said lever, one of the arms of said lever being pivotally connected to said motor body at a first location spaced from said second point, and an articulation member pivotally connected to said structure at a third point fixed on said structure and pivotally connected with the other arm of said double-arm lever at a second location, at least one of said first and second locations being always offset from a line connecting said second and third pivot points.

2. A transmisison as defined in claim 1 wherein said articulation member is a second hydrostatic motor hydraulically connected with said pump in parallel with the first-mentioned hydrostatic motor and drivable by said pump, said second hydrostatic motor having a tiltable motor body with an axis swingable about said third point and being of variable capacity controllable by the tilt of its motor body about said third point, said first and second locations being offset from the axes of the bodies of said first and second motors, respectively, to opposite sides of said axes, said pump having an input shaft aligned with the axis of said pump body in a zero-displacement null position of said pump an said motors having respective output shafts coaxial with one another and disposed symmetrically on opposite sides of an axial plane through said input shaft and perpendicular to said output shaft.

3. A transmission as defined in claim 2 wherein said link and said lever are formed with duct means for hydraulically connecting said pump and said motors.

4. A transmission as defined in claim 2 wherein said mechanical coupling means is so constructed and arranged that the axes of said motor bodies include maximum angles with the axes of the respective output shafts in the null position of said pump body.

5. A transmission as defined in claim 4 for an automotive vehicle, further comprising an internal-combustion engine operatively connected with said input shaft for driving same, and a pair of driven wheels respectively connected with said output shafts for rotation by said motors.

6. A transmission as defined in claim 5, further comprising planetary-gear means connected between said output shafts and said driven wheels.

7. A transmission as defined in claim 4, further comprising control means for tilting said pump body about said first point, said control means comprising a hydraulic control cylinder coupled with said pump body, a control valve connected with said cylinder, and a hydraulic pump driven by said input shaft and connected to said valve for feeding said cylinder.

8. A transmission as defined in claim 4, further comprising friction-brake means cooperating with said output shaft for restricting the rotation thereof.

9. A transmission as defined in claim 8 wherein said link and said lever are formed with duct means for hydraulically connecting said pump and said motors.

10. A transmission as defined in claim 2, further comprising means forming a guideway for the pivot connecting said lever with said link.

References Cited

UNITED STATES PATENTS

| | | | |
|---|---|---|---|
| 2,161,439 | 6/1939 | Thoma | 60—53 |
| 2,975,597 | 3/1961 | Arz | 60—53 |
| 2,981,068 | 4/1961 | Foerster et al. | 60—53 |
| 3,142,963 | 8/1964 | Thoma | 60—53 |
| 3,142,964 | 8/1964 | Thoma et al. | 60—53 |
| 3,163,987 | 1/1965 | Dowty et al. | 60—53 |
| 3,261,421 | 7/1966 | Forster et al. | 60—53 |
| 3,279,173 | 10/1966 | Stolz | 60—53 |
| 3,299,635 | 1/1967 | Forster et al. | 60—53 |

LEO FRIAGLIA, *Primary Examiner.*

MILTON L. SMITH, *Assistant Examiner.*

U.S. Cl. X.R.

60—53